(12) United States Patent
Brittingham et al.

(10) Patent No.: US 8,752,279 B2
(45) Date of Patent: Jun. 17, 2014

(54) METHODS OF PROTECTING AN AIRCRAFT COMPONENT FROM ICE FORMATION

(75) Inventors: David L. Brittingham, Canton, OH (US); Stanley G. Prybyla, Brecksville, OH (US); Daniel P. Christy, Akron, OH (US)

(73) Assignee: Goodrich Corporation, Charlotte, NC (US)

( * ) Notice: Subject to any disclaimer, the term of this patent is extended or adjusted under 35 U.S.C. 154(b) by 127 days.

(21) Appl. No.: 13/082,627

(22) Filed: Apr. 8, 2011

(65) Prior Publication Data

US 2011/0180524 A1    Jul. 28, 2011

Related U.S. Application Data

(63) Continuation of application No. 11/960,278, filed on Dec. 19, 2007, now abandoned.

(60) Provisional application No. 60/878,629, filed on Jan. 4, 2007.

(51) Int. Cl.
*H05B 3/00* (2006.01)

(52) U.S. Cl.
USPC .................. 29/611; 29/613; 29/620

(58) Field of Classification Search
USPC ........... 29/611, 613, 619, 620; 219/201, 202, 219/529, 548, 553; 244/134 D, 134 E, 134 R; 428/293.7, 297.4, 347, 411.1, 903
See application file for complete search history.

(56) References Cited

U.S. PATENT DOCUMENTS

| | | | |
|---|---|---|---|
| 2,496,279 A | 2/1950 | Roberts et al. |
| 2,627,012 A | 1/1953 | Kinsella et al. |
| 3,178,560 A | 4/1965 | Mapp et al. |
| 3,266,005 A | 8/1966 | Balde et al. |
| 3,349,359 A | 10/1967 | Morey |

(Continued)

FOREIGN PATENT DOCUMENTS

| | | |
|---|---|---|
| DE | 162009 | 1/1919 |
| DE | 1615123.8 | 5/1970 |

(Continued)

OTHER PUBLICATIONS

Combined Search and Examination Report in application No. GB0725083.0, Mar. 31, 2008, pp. 1-5, UK Intellectual Property Office.

(Continued)

*Primary Examiner* — Thiem Phan
(74) *Attorney, Agent, or Firm* — Cantor Colburn LLP

(57) ABSTRACT

A method for protecting an aircraft component from ice formation uses a thermally conductive film. The film includes a polymer, an electrically conductive material, and a sufficient concentration of hexagonal boron nitride to provide adequate heat transfer properties, and have high thermal conductivity, peel strength, and shear strength. The films can include thermoset polymers, thermoplastic polymers, or blends thereof, and can also include reinforcing materials such as fiberglass, carbon fiber, metal mesh, and the like, and thermally conductive fillers, such as aluminum oxide, aluminum nitride, and the like. The films can be included in composite materials. The films can be used as part of a layered structure, and used in virtually any application, for example, various locations in aircraft, where heating is desirable, including nacelle skins, airplane wings, heated floor panels, and the like.

20 Claims, 1 Drawing Sheet

(56) References Cited

U.S. PATENT DOCUMENTS

| | | |
|---|---|---|
| 3,367,851 A | 2/1968 | Fiireis et al. |
| 3,385,959 A | 5/1968 | Ames et al. |
| 3,397,302 A | 8/1968 | Hosferd |
| 3,420,476 A | 1/1969 | Schultz et al. |
| 3,495,328 A | 2/1970 | Ziver |
| 3,657,516 A | 4/1972 | Fujihara |
| 3,800,121 A | 3/1974 | Dean et al. |
| 3,885,758 A | 5/1975 | Croswell, Jr. |
| 3,935,422 A | 1/1976 | Barnes et al. |
| 4,021,008 A | 5/1977 | Eichenauer |
| 4,036,457 A | 7/1977 | Volkner et al. |
| 4,062,917 A | 12/1977 | Hill et al. |
| 4,250,397 A | 2/1981 | Gray et al. |
| 4,291,079 A | 9/1981 | Horn |
| 4,429,216 A | 1/1984 | Brigham |
| 4,468,557 A | 8/1984 | Bylin et al. |
| 4,473,740 A | 9/1984 | Ellis |
| 4,514,619 A | 4/1985 | Kugelman |
| 4,518,851 A | 5/1985 | Oppitz |
| 4,534,886 A | 8/1985 | Kraus et al. |
| 4,737,618 A | 4/1988 | Barbier et al. |
| 4,743,740 A | 5/1988 | Adee |
| 4,826,108 A | 5/1989 | Briscoe et al. |
| 4,837,618 A | 6/1989 | Hatori et al. |
| 4,942,078 A | 7/1990 | Newman et al. |
| 4,972,197 A | 11/1990 | McCauley et al. |
| 4,983,814 A | 1/1991 | Ohgushi et al. |
| 5,023,433 A | 6/1991 | Gordon |
| 5,098,037 A | 3/1992 | Leffel et al. |
| 5,192,605 A | 3/1993 | Mercuri et al. |
| 5,248,116 A | 9/1993 | Rauckhorst et al. |
| 5,344,696 A | 9/1994 | Hastings et al. |
| 5,351,918 A | 10/1994 | Giamati et al. |
| 5,356,096 A | 10/1994 | Rauckhorst et al. |
| 5,361,183 A | 11/1994 | Wiese |
| 5,424,054 A | 6/1995 | Bethune et al. |
| 5,427,332 A | 6/1995 | Rauckhorst et al. |
| 5,445,327 A | 8/1995 | Creehan |
| 5,453,597 A | 9/1995 | McWilliams |
| 5,470,413 A | 11/1995 | Cedarleaf |
| 5,475,204 A | 12/1995 | Giamati et al. |
| 5,566,892 A | 10/1996 | Creehan |
| 5,584,450 A | 12/1996 | Pisarski |
| 5,653,836 A | 8/1997 | Mnich et al. |
| 5,657,951 A | 8/1997 | Giamati et al. |
| 5,657,952 A | 8/1997 | Goldberg |
| 5,700,743 A | 12/1997 | Puchinger et al. |
| 5,747,161 A | 5/1998 | Iijima |
| 5,765,779 A | 6/1998 | Hancock et al. |
| 5,824,996 A | 10/1998 | Kockman et al. |
| 5,925,275 A | 7/1999 | Lawson et al. |
| 5,934,617 A | 8/1999 | Rutherford et al. |
| 5,942,140 A | 8/1999 | Miller et al. |
| 5,947,418 A | 9/1999 | Bessiere et al. |
| 5,971,323 A | 10/1999 | Bauch et al. |
| 6,027,075 A | 2/2000 | Petrenko |
| 6,031,214 A | 2/2000 | Bost et al. |
| 6,054,690 A | 4/2000 | Petit et al. |
| 6,094,907 A | 8/2000 | Blackner |
| 6,137,083 A | 10/2000 | Bost et al. |
| 6,145,787 A | 11/2000 | Rolls |
| 6,194,685 B1 | 2/2001 | Rutherford et al. |
| 6,227,492 B1 | 5/2001 | Schellhase et al. |
| 6,237,874 B1 | 5/2001 | Rutherford et al. |
| 6,279,856 B1 | 8/2001 | Rutherford et al. |
| 6,328,258 B1 | 12/2001 | Porte |
| 6,330,986 B1 | 12/2001 | Rutherford et al. |
| 6,338,455 B1 | 1/2002 | Rauch et al. |
| 6,371,242 B1 | 4/2002 | Wilson et al. |
| 6,403,935 B2 | 6/2002 | Kockman et al. |
| 6,427,946 B1 | 8/2002 | Petrenko |
| 6,483,087 B2 | 11/2002 | Gardner et al. |
| 6,521,873 B1 | 2/2003 | Cheng et al. |
| 6,576,115 B2 | 6/2003 | Petrenko |
| 6,639,381 B2 | 10/2003 | Tamura et al. |
| 6,680,016 B2 | 1/2004 | Wang et al. |
| 6,706,402 B2 | 3/2004 | Rueckes et al. |
| 6,725,542 B1 | 4/2004 | Maguire |
| 6,762,396 B2 | 7/2004 | Abbott et al. |
| 6,783,746 B1 | 8/2004 | Zhang et al. |
| 6,835,591 B2 | 12/2004 | Rueckes et al. |
| 6,848,656 B2 | 2/2005 | Linton |
| 6,870,139 B2 | 3/2005 | Petrenko |
| 6,939,525 B2 | 9/2005 | Colbert et al. |
| 6,986,853 B2 | 1/2006 | Glatkowski et al. |
| 7,026,432 B2 | 4/2006 | Charti et al. |
| 7,029,603 B2 | 4/2006 | Wang et al. |
| 7,034,257 B2 | 4/2006 | Petrenko |
| 7,060,241 B2 | 6/2006 | Glatkowski |
| 7,078,658 B2 | 7/2006 | Brunner et al. |
| 7,105,596 B2 | 9/2006 | Smalley et al. |
| 7,153,452 B2 | 12/2006 | Ogale et al. |
| 7,157,663 B1 | 1/2007 | Kizmartan |
| 7,198,745 B2 | 4/2007 | Newman et al. |
| 7,211,772 B2 | 5/2007 | Carpin et al. |
| 7,220,484 B2 | 5/2007 | Ton-That et al. |
| 7,229,683 B2 * | 6/2007 | Fischer et al. ............ 428/293.7 |
| 2002/0096506 A1 | 7/2002 | Moreland et al. |
| 2002/0153367 A1 | 10/2002 | Haas |
| 2002/0175152 A1 | 11/2002 | Petrenko |
| 2003/0155467 A1 | 8/2003 | Petrenko |
| 2003/0222077 A1 | 12/2003 | Suda et al. |
| 2003/0234248 A1 | 12/2003 | Kano et al. |
| 2004/0065659 A1 | 4/2004 | Tse |
| 2004/0069772 A1 | 4/2004 | Kondo et al. |
| 2004/0071990 A1 | 4/2004 | Moriyama et al. |
| 2004/0074899 A1 | 4/2004 | Mariner et al. |
| 2004/0237502 A1 | 12/2004 | Moe et al. |
| 2004/0241410 A1 | 12/2004 | Fischer et al. |
| 2005/0006529 A1 | 1/2005 | Moe et al. |
| 2005/0127329 A1 | 6/2005 | Wang et al. |
| 2005/0178924 A1 | 8/2005 | Bertolotti |
| 2005/0189345 A1 | 9/2005 | Brunner et al. |
| 2006/0032983 A1 | 2/2006 | Brand et al. |
| 2006/0043240 A1 | 3/2006 | Hindal et al. |
| 2006/0052509 A1 | 3/2006 | Saitoh |
| 2006/0058443 A1 | 3/2006 | Ohashi et al. |
| 2006/0078705 A1 | 4/2006 | Glatkowski et al. |
| 2006/0135677 A1 | 6/2006 | Huang et al. |
| 2006/0155043 A1 | 7/2006 | Johnson et al. |
| 2006/0166003 A1 | 7/2006 | Khabashesku et al. |
| 2006/0217482 A1 | 9/2006 | Lukehart et al. |
| 2006/0249711 A1 | 11/2006 | Niu et al. |
| 2007/0131915 A1 | 6/2007 | Stankovich et al. |
| 2007/0241303 A1 | 10/2007 | Zhong et al. |
| 2007/0298669 A1 | 12/2007 | Barrera et al. |
| 2008/0020193 A1 | 1/2008 | Jang et al. |
| 2008/0166563 A1 | 7/2008 | Brittingham et al. |

FOREIGN PATENT DOCUMENTS

| | | |
|---|---|---|
| DE | 2832119 | 8/1979 |
| EP | 0680878 | 11/1995 |
| EP | 1109218 | 2/2003 |
| EP | 1600469 | 11/2005 |
| EP | 1865150 | 12/2007 |
| FR | 2132759 | 11/1972 |
| GB | 1117843 | 6/1968 |
| GB | 1247071 | 9/1971 |
| GB | 1314162 | 4/1973 |
| GB | 2243412 | 10/1991 |
| GB | 2258095 | 1/1993 |
| GB | 2259287 | 3/1993 |
| GB | 2445458 | 2/2010 |
| JP | 60072732 A | 9/1983 |
| JP | 02110196 A | 10/1988 |
| JP | 05140486 A | 11/1991 |
| JP | 06036853 | 7/1992 |
| JP | 2002080617 A | 9/2000 |
| JP | 2003136634 | 10/2001 |
| WO | 00/33614 | 4/1973 |
| WO | 91/11891 | 8/1991 |
| WO | 02/076430 | 10/2002 |
| WO | 03/062056 | 7/2003 |

(56) References Cited

FOREIGN PATENT DOCUMENTS

| WO | 03/069955 | 8/2003 |
|---|---|---|
| WO | 03/076703 | 9/2003 |
| WO | 2004/001107 | 12/2003 |
| WO | 2005/020635 | 3/2005 |
| WO | 2005/028174 | 3/2005 |
| WO | 2006/008518 | 1/2006 |

OTHER PUBLICATIONS

Evans et al; Nickel Coated Graphite Fiber Conductive Composites, SAMPE Quarterly, vol. 17, No. 4, Jul. 1986.

Takesue et al.; Superconductivity in Entirely End-Bonded Miltiwalled carbon Nanotubes, Feb. 10, 2006, pp. 1-4; PRL 96,057001 (2006); The American Physical Society.

European Search Report in European application No. EP06005410.3-2315, dated Jul. 6, 2006, pp. 1-13; European Patent Office.

Extended Search Report in European application No. 06005410.3-2315, dated Jul. 6, 2006; pp. 1-13; EPO.

Miller and Harris; The Carbon Nanotube Patent Landscape, nanotechnology Law & Business, Dec. 2006; pp. 427-454.

Fielding et al.; Nanocomposites for Lightning Strike Protection, U.S. Government; pp. 1-14, Known as of Oct. 31, 2007.

Search Report in application No. PCT/US2007/063717, dated Sep. 10, 2008; pp. 1-5; EPO.

Search Report in application No. GB0725083.0, dated Sep. 16, 2008; pp. 1-2, UK Intellectual Property Office.

Official Action from German Patent and Trademark Office, application No. DE 10 2007 061 548.7-43, dated Jan. 15, 2010.

* cited by examiner

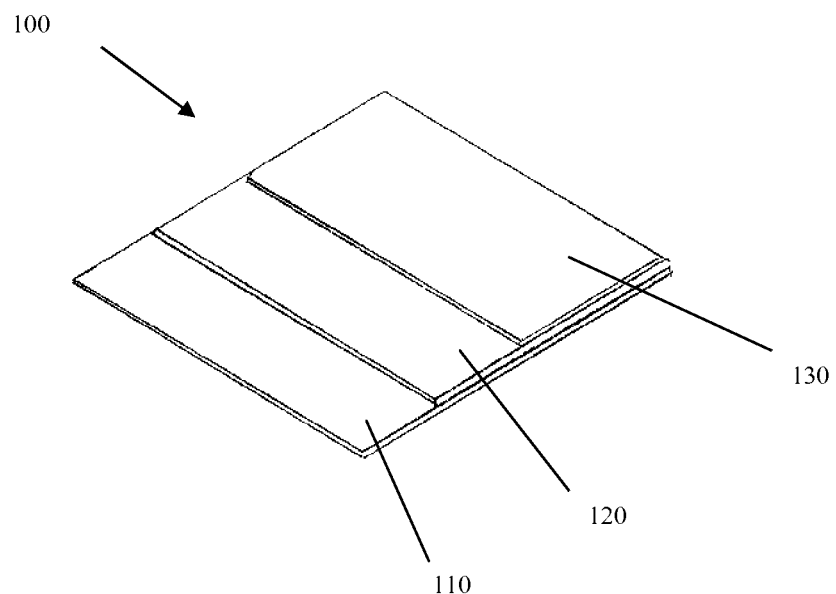

METHODS OF PROTECTING AN AIRCRAFT COMPONENT FROM ICE FORMATION

RELATED APPLICATIONS

This is a Continuation of U.S. patent application Ser. No. 11/960,278, filed 19 Dec. 2007, which claims priority to U.S. Provisional Patent Application No. 60/878,629, filed 4 Jan. 2006. The contents of the aforementioned applications are incorporated by reference in their entirety.

BACKGROUND OF THE INVENTION

1. Field of the Invention

The present invention is generally in the field of polymeric films or composite materials including hexagonal boron nitride, composite materials formed from the films, and electrothermal heaters and/or heat sinks formed from the films or composite materials.

2. Description of the Related Art

There are currently various electrothermal de-icing or anti-icing products for leading edge ice protection of aero surfaces. These typically use heating elements or electrodes disposed at a leading edge surface of the aero structure in the form of a serpentine or interdigitated finger area grid to deliver heat to any ice formed on the surface. Typical electrothermal de-icing or anti-icing products utilize an embedded heating element, which is located below the external surface. Heat generated by electrothermal element must pass through a thick layer of thermally insulating polymer matrix composite prior to transfer of heat to the surface-ice interface.

It would be advantageous to provide new electrothermal ice protection systems which facilitate the rapid transfer of thermal energy to the surface-ice interface, providing energy savings and enhanced functionality. It would further be advantageous to provide electrothermal ice protection systems rugged enough to withstand exposure to an aero structure operational environment, and capable of shedding ice from an aero surface at safe voltages and power levels, ideally before the ice accretes to produce any appreciable thickness. The present invention provides such systems.

SUMMARY OF THE INVENTION

Films comprising a polymer and a sufficient concentration of hexagonal boron nitride to provide adequate heat transfer properties for use in electrothermal heating applications are disclosed. Composite materials including these films, and electrothermal heaters formed from these composite materials, are also disclosed.

The films comprise a polymer and hexagonal boron nitride. The polymer can be a thermoset polymer, a thermoplastic polymer, or a blend thereof. The film can also include other components, for example, electrically conductive materials, including nanoparticulate materials such as carbon nanotubes, carbon nanofibers, metal nanowires, metal-coated glass microbubbles, graphene sheets, and the like. These materials are typically present in a range of from about 10 percent to about 60 percent by weight of the hexagonal boron nitride. Also, the films can be reinforced with various materials, such as fiberglass, carbon fiber, metal mesh, and the like, and thermally conductive fillers, such as aluminum oxide, aluminum nitride, and the like, can optionally be added.

The films can be formed by blending polymerizable monomers and hexagonal boron nitride, spreading the blend into a film thickness, and curing the monomers. In some embodiments, the blend is fairly viscous at room temperature, for example, the viscosity of paste or putty, and can be warmed to temperatures above room temperature to thin the blend to make it easier to spread. The films can also be formed by blending thermoplastic polymers and hexagonal boron nitride, and casting the blend into a film. In one aspect, the thermoplastic polymers are melted or softened before blending, or the blend is heated to an elevated temperature to facilitate spreading. The melted polymers can be cooled to form the resulting film.

The films ideally have suitable physical properties for inclusion in laminates subjected to a wide range of environmental conditions. These properties include high thermal conductivity, peel strength, and shear strength. The thermal conductivity must be suitably high to permit rapid heating. The peel strength of the film must be suitably high to prevent delamination. The shear strength must also be relatively high for the film to have desirable properties.

In one aspect, the thermally conductive films are included in a composite material that includes an insulating layer, an electrically conductive film layer, and thermally conductive film layer which includes hexagonal boron nitride. As current is passed through the electrically conductive film layer, and the layer heats up, the heat passes through the electrically conductive layer but not, at least to a significant extent, through the insulating layer. Thus, this composite material can be used in electrothermal heating applications.

In another aspect, the thermally conductive films include, in addition to the hexagonal boron nitride, sufficient electrically conductive materials, such as electrically conductive nanoparticulate materials, such that the films can both produce heat and conduct the heat. When a composite material including this type of film and a thermally insulating film is used, it can perform substantially the same function including the thermally insulating layer, the electrically conductive layer, and the thermally conductive layer, but with one less layer.

In a third aspect, the thermally conductive film includes, in addition to the hexagonal boron nitride, electrically conductive materials, in an amount sufficient to increase the thermal conductivity of the layer, but insufficient to cause the layer to be electrically conductive.

Thus, depending on the desired use, the films can act as resistors, and not conduct electricity, or they can conduct electricity, where the degree of conductance of the film can be modulated by including, in addition to the hexagonal boron nitride, various amounts of electrically conductive nanoparticulate materials.

The films, and composite materials including the films, can be included as part of the composite material used to form a wing, nacelle, or other outer surface of an aeroplane and serve to de-ice the wing, nacelle, or other outer surface. Alternatively, the films and composites can be used in other heating applications, for example, floor panels, water tanks, pipes, and the like.

BRIEF DESCRIPTION OF THE DRAWINGS

FIG. 1 illustrates one embodiment of a composite material comprising a thermally conductive film of the present invention.

DETAILED DESCRIPTION OF A PREFERRED EMBODIMENT

In accordance with the present invention, thermally conductive films, composite materials formed from the films, composite materials including the films, and electrothermal heaters including the composite materials, are all described herein. The present invention will be better understood with reference to the following detailed description.

In one embodiment, the composition that can be formed into a thermally conductive film comprises a polymerizable monomer and hexagonal boron nitride. In another embodiment, the composition comprises a meltable thermoplastic resin and hexagonal boron nitride.

The boron nitride powder used to prepare the films described herein is not limited by any particular type of crystalline system, shape and size of powder grain, cohesion degree of powder particle or particle distribution. With respect to the crystalline form, boron nitride powder of hexagonal, cubic, wurtzite, rhombohedral, or any other crystal forms can be used. Among them, hexagonal boron nitride powder of the commercially available hexagonal form, which provides heat conductivity of roughly 10 to 100 W/mK or so, or of cubic structure presenting an extremely high heat conductivity of 1300 W/mK maximum, can be used.

The particle shape of hexagonal boron nitride powder is not limited to scaled, or flat shape, but hexagonal boron nitride powder of various particle forms such as granular, lump, spheric, fiber, whisker-shaped hexagonal boron nitride powder, or ground products of these can be used. The particle diameter of hexagonal boron nitride powder can vary, however, the individual average primary diameter in the range of 0.01 to 100 µm, or more preferably, in the range of 0.1 to 20 µm can be used. No practical limit is found with regard to the minimum hexagonal boron nitride particle size, while a hexagonal boron nitride powder of larger than 100 µm is difficult to produce and is not easily entrained into thin polymer films. When scaled hexagonal boron nitride powder is used, a range of 0.5 to 50 µm as maximum diameter can be easily blended into the film, and may be oriented using a magnetic field, if desired. Additionally, hexagonal boron nitride powder in the form of cohered primary particles can be used.

In some embodiments, the hexagonal boron nitride has a bi-modal particle size, whereby the bimodal particle size allows for more intimate contact of particles, and enhanced thermal conductivities, even at lower overall particle content.

The concentration of hexagonal boron nitride powder in the heat conductive film is typically in the range of from about 12 percent to about 40 percent by weight, based on the total weight of the film. In one embodiment, the film comprises nanoparticulate materials, in which case a range of from about 0.2 percent to about 2.0 percent by weight of hexagonal boron nitride powder is preferred. If more than these preferred amounts are used, the viscosity of the composition increases and the fluidity decreases, making the handling difficult. Also, air bubbles can enter making it difficult to form a film while the shear strength and other physical properties can suffer.

The hexagonal boron nitride can be, but need not be, aligned. The alignment of the particles can be performed, for example, using a magnetic field using means known to those of skill in the art. Also, the hexagonal boron nitride particles can be surface treated prior to use using means known to those of skill in the art.

The films typically include thermoset monomers capable of forming thermoset polymers. Conventional thermoset resin systems which can be used to form the films include, for example, epoxy based resin systems, matrices of bismaleimide (BMI), phenolic, polyester, PMR-15 polyimide, acetylene terminated resins, acrylics, polyurethanes, free-radically induced thermosetting resins, and the like. As a result of such considerable choices in thermosetting resins, the primers, paints and/or films of the invention can be tailored as desired.

Suitable epoxy resins include those used in established thermoset epoxy/fiber reinforced prepregs used in manufacturing aircraft components. They are frequently based, inter alia, on one or more of diglycidyl ethers of bisphenol A (2,2-bis(4-hydroxyphenyl)propane) or sym-5 tris(4-hydroxyphenyl)propane, tris(4-hydroxyphenyl)methane, bisphenol F, tetrabromobisphenol A, their polyepoxide condensation products, cycloaliphatic epoxies, epoxy-modified novolacs (phenol-formaldehyde resins) and the epoxides derived from the reaction of epichlorohydrin with analine, o-, m- or p-aminophenol, and methylene dianaline.

The epoxy resin systems contain epoxy curing agents which cure the resin to a solid, infusible product. For this purpose, epoxy curing agents which are acidic, neutral or alkaline may be used. Examples include, among others, amine hardeners, phenols, acid anhydrides, polyamides and Lewis acids and bases. Accelerators may also be used to decrease the cure time and include imidazoles and substituted ureas.

The amount of the hardener employed is usually stoichiometrically equivalent on the basis of one amine group per epoxy group in the resin. Some adjustment of the stoichiometry may be required with the addition of the nanoreinforcement.

The hexagonal boron nitride and, optionally, other components, can be added to thermoset monomer, hardener, or mixed resin. The method of dispersion will depend on when the hexagonal boron nitride is added. For example, if the hexagonal, boron nitride is added to a B-staged resin, the high viscosity may require heating and ultrasonic dispersion or high shear mixing. The hexagonal boron nitride can also be deposited onto the film surface using heat or adhesive to hold it in place during composite processing.

The hexagonal boron nitride can also be added to a thermoplastic polymer formed from thermoset monomers for consolidation with a thermoplastic structure, or bonding with a thermoset structure. In a preferred embodiment, the hexagonal boron nitride is present in concentrations of from about 5 percent to about 50 percent by weight based on the weight of the thermoplastic polymer. Conventional thermoplastic systems which can be used include, for example, polyetheretherketone (PEEK), polyetherketone (PEK), polyphenylenel sulfide (PPS), polyethylene sulfide (PES), polyetherimide (PEI), polyvinylidene fluoride (PVDF), polysulfone (PS), polycarbonate (PC), polyphenylene ether/oxide, nylons, aromatic thermoplastic polyesters, aromatic polysulfones, thermoplastic polyimides, liquid crystal polymers, thermoplastic elastomers, and the like.

The hexagonal boron nitride can be added to the thermoplastic, which can then be mixed with a thermoset, before cure or vice versa. The hexagonal boron nitride can be added to one thermoplastic, which is then mixed with another thermoplastic (e.g., pellets made and then extruded simultaneously).

In addition to the polymer and hexagonal boron nitride, the composition used to form the film can include additional components, for example, those which enhance the strength of the film and those which enhance the electrical conductivity of the film.

Examples of materials that enhance the strength of the film include materials commonly found in pre-pregs, such as carbon fibers, fiberglass, metal wires or mesh, and the like. Examples of materials used to enhance the conductivity of the film include nanoparticulate materials, which are described in more detail below.

Electrically conductive materials added to the hexagonal boron nitride containing film may allow the film to double as both the heat source and as a means for delivering heat quickly to the ice interface. In this configuration it is desirable to provide rapid heat transfer to the ice interface by placing an electrically insulating, thermally conducting layer between the heat source and the external skin, while placing an electrically and thermally insulating layer on the backside to prevent heat losses away from the ice interface. In total, this configuration directs thermal energy to the ice interface.

An embodiment of this configuration would be the use of hexagonal boron nitride particles in combination with a carbon fiber or woven carbon fabric containing pre-preg. The combination of hexagonal boron nitride and carbon fabric will allow for rapid and efficient transfer of energy away from the carbon fabric heat source. The ability to rapidly transfer heat and equally rapidly stop the transfer of heat to the ice interface provides the simultaneous benefits of efficient ice shedding and limiting of runback and refreezing of shed ice.

In one aspect, the films include powders, such as copper powder, carbon nanotubes or nanofibers which are also known as a type of multi-walled carbon nanotubes (collectively, carbon nanotubes), and which are distributed throughout the carrier, ideally in a substantially homogenous fashion.

In this aspect, the powders typically have a particle size in the range of 4 nm to 100 µm. The particles can be irregular in shape or, smooth and round, or have texture. One example of a suitable textured particle is a "spiky" copper powder where the carbon nanotubes are embedded into the copper. While not wishing to be bound by a particular theory, it is believed that the presence of the carbon nanotubes brings the CTE of the polymer closer to that of the metal powder, such that the material can conduct sufficient electrical energy to provide sufficient heat energy.

In one embodiment, a heating element having the capacity to carry up to 10 amperes, leading to watt densities at the ice interface of up to 30 watt/in$^2$ for anti-icing operation is provided.

In one embodiment, the heating element is separate from the thermally conducting, electrically insulating layer and the thermally conducting, electrically insulating layer lies between the heating element and the surface skin to enable rapid conduction of heat to the ice/surface interface.

In a second embodiment, the heating element consists of a combination of electrically conductive and thermally conductive materials. In this case, the heating element may be thermally conductive and optionally electrically conductive. Alternatively, the heating element may be electrically conductive, and a second material present along with the heater may be thermally conductive, electrically conductive, or a combination of both. In this second embodiment, a thermally conducting, electrically insulating layer separates the heater from the surface skin and the ice interface.

In a third embodiment, a mixture of thermally and electrically conductive nanoparticles is mixed with hexagonal boron nitride in such a manner that the conductive nanoparticles do not reach their percolation limit, i.e. they do not touch each other and therefore form a discontinuous network. However, the thermal conductivity of the nanoparticles provides a synergistic effect of enhancing the overall thermal conductivity of the mixture beyond that attainable without the presence of the thermally and electrically conductive nanoparticles.

The film can be reinforced with carbon nanotubes (CNT), carbon nanofibers (CNF) or graphite nanoplatelets. The carbon nanotubes can be present in as little as from about 0.1 percent to about 5.0 percent by weight of the surface film. The CNT weight can be optimized to match the CTE of the hexagonal boron nitride film, to minimize microcracking and allow the use of a lighter surface film.

In another aspect of the invention, the film comprises metal coated particles, for example, silver-coated, hollow glass microspheres and/or metal-coated carbon nanotubes (collectively, silver coated particles). While not wishing to be bound by a particular theory, it is believed that the metal coating helps with the dispersion of the particles within the film. In one embodiment, a silver coating is applied onto carbon nanotubes by electroless plating, which is believed to improve the interfacial adhesion of the composites to which the material is applied. The metal-coated particles can be subjected to pretreatments such as oxidation, sensitizing treatment and activation treatment, which can introduce various functional groups on the particles. These functional groups can improve the dispersion of the particles into the film, increase the number of activated sites, and lower the deposition rate.

In another aspect, carbon nanotubes only can be added to the polymer film. The 10,10 armchair configuration carbon nanotube has a resistivity close to copper and it is six times lighter than copper, and accordingly may be a preferred nanotube. The nanotubes may be aligned through various methods, including mechanical, chemical, and magnetic methods. For example, the nanotubes can be mixed with the polymerizable monomer and extruded into a film coating. The feed screw can be vibrated to improve the alignment of fibers in the flow direction (similar to vibration injection molding used with recycled thermoplastics). The nanotubes can be functionalized to react with the tail or head of each nanofiber such that it will self-assemble (similar to lipid bi-layer assembly). This would require optimizing the nanotube loading so that the nanotubes attract each ether, while also ensuring that the epoxy does not interfere with the process. Finally, the nanotubes can be made such that a nickel particle is attached to one end. Ferrous alloy nanoparticles and carbon nanotubes (with the nickel particle) can be added to the adhesive, primer, or paint and subjected to a magnetic field to align the nanotubes.

Metal nanorods/nanowires/nanostrands (collectively called nanowires) can also be used. Carbon nanotubes or others nanoparticles that have been modified to decrease the resistivity can be added to the film. These modified nanotubes can be oriented in-plane to replace or reduce the metal screen.

The use of carbon nanotubes, the metal powder/carbon nanotube blends, low density metal screens reinforced with carbon nanotubes, metal-coated particles and/or aligned graphite nanoplatelets can provide electrical conductivity to the thermally conductive film.

The compositions described above can be formed into thermally conductive films. The manner in which the films are formed depends, in part, on the nature of the compositions, i.e., whether they include thermoplastic materials or curable thermoset resins.

In one aspect, the films are formed by blending polymerizable monomers and hexagonal boron nitride, spreading the blend into a film thickness, and curing the monomers. In some embodiments, the blend is fairly viscous at room temperature, for example, the consistency of paste of putty, and can be warmed to temperatures above room temperature to thin the blend to make it easier to spread.

In another aspect, the films are formed by blending thermoplastic polymers and hexagonal boron nitride, and casting the blend into a film. In one aspect, the thermoplastic polymers are melted or softened before blending, or the blend is heated to an elevated temperature to facilitate spreading.

The pre-cured composition comprising the hexagonal boron nitride, and, optionally, nanoparticulate conductive materials, can be placed on a surface of a composite structure via conventional means, such as knife coating or doctor blading. In one embodiment, the hexagonal boron nitride and polymerizable monomer blend is spread into a thin layer and the monomers are polymerized.

If the film includes too much hexagonal boron nitride, the film can suffer from relatively low shear strength. Alternatively, if the film does not include sufficient hexagonal boron nitride, there is not sufficient thermal conductivity. For this reason, the amount of hexagonal boron nitride in the film is ideally in the range of from about 12 percent to about 40 percent by weight, based on the total weight of the film. Preferably, the concentration of hexagonal boron nitride in the film is from about 27 percent to about 33 percent by weight, based on the total weight of the film. The hexagonal boron nitride provides the film with electrical conductance, which advantageously is between $10^{+10}$ and $10^{+15}$ ohm-cm.

The rate at which the film provides heating and/or cooling can be important. By uniformly mixing the hexagonal boron nitride in the polymer material, there is a high degree of uniformity and a relatively high heat-up rate. In addition to having a relatively high thermal conductivity, the material also has a relatively high "heat-up" rate. In one embodiment the material has a thermal conductivity of 4.33 W/mK, which is very high. The heat-up rate, which is proportional to thermal conductivity, is rapid.

Although virtually any polymer can be used to form the films, there are some situations where the films will be subjected to extreme heat variations. For example, when used in aerospace applications, temperature variations from 120° F. to −140° F. might be observed. The film must be capable of avoiding delamination under this type of temperature variation. In these embodiments, epoxy resins are preferred for forming such films. Representative epoxy resins include, but are not limited to, diglycidyl ethers of bisphenol A (2,2-bis (4-hydroxyphenyl)propane)orsym-tris(4-hydroxkyyphenyl) propane, tris(4-hydroxyphenyl)methane, bisphenol F, tetrabromobisphenol A, their polyepoxide condensation products, cycloaliphatic epoxies, epoxy-modified novolacs (phenol formaldehyderesins) and the epoxides derived from the reaction of epichlorohydrin with analine, o-, m- or p-aminophenol, and methylene dianaline.

In one embodiment, the thermally conductive films of the present invention can form, in part, composite materials. The composite materials described herein include various layers laminated to the thermally conductive film layer. These composite materials typically include superposed sheets, layers and plies. As illustrated in FIG. 1, the composite material 100 includes an insulating layer 110, an electrically conductive layer 120, and an thermally conductive layer 130 in one embodiment. Additional materials can be adhered over or under these layers, and in some embodiments, the electrically conductive layer 120 is also the thermally conductive layer 120. When used in aircraft applications, the composite can be covered, for example, with one or more metal layers used to form the "skin" of the aircraft, or, alternatively, can include a further layer of a composite material, such as a carbon fiber layer.

As shown in the embodiment illustrated in FIG. 1, a composite layer with no electrical conductivity and low thermal conductivity (an insulating layer 110) typically lies beneath the electrically conductive layer 120. Insulating layers 110 provide insulation with respect to electricity and, also, ideally, with respect to heat.

Electrically conductive layers 120 provide the heat that the thermally conductive layer 130 transfers to the outer surface. These layers typically lie beneath, in some cases, directly beneath, the thermally conductive layer 130, except in those embodiments where the thermally conductive layer 130 is also an electrically conductive layer 120. The electrically conductive layer 120 can include components commonly present in typical electrothermal heaters and their constructions, including metal wires, foils, and mesh, which can be buried in fiberglass or other thermally nonconducting materials.

The thermally conductive layer 130 has two faces, one of which is in contact with a source of heat, and another face which is or is in contact with a surface to be heated. The thermally conducting films described herein can enhance the performance of these heaters, by increasing the speed in which the heat is transferred. The composite materials described herein can be used to prepare aircraft fuselage or an aircraft component.

Additional layers can include various prepregs, fabrics, honeycomb core, foam core, resin and adhesive layers. The structure may be fabricated using dry fabrics which are infused with resin using resin film infusion or resin transfer molding. The electrically conductively layer may also be laid up dry and infused with the polymer during composite fabrication. One or more of the layers in the composite material can be woven materials including fiberglass, aramid, carbon prepreg, or other fibers, and/or can include non-woven layers. In one embodiment, a layer capable of dissipating energy from a lightning strike (i.e., a lightning strike protection layer) is placed over the thermally conductive layer.

The films, or composite materials including the films, can be used as components of electrothermal heaters, which can be used for example, as an electro-thermal ice protection system for an airfoil. The films can be used as part of a layered structure, and applied in virtually any location in an aircraft where heating is desirable. For example, the film can be one layer of a nacelle skin, or on a wing. The film can be used to provide heated floor panels.

Current resistive heaters formed from metal foils adhered to an adhesive film, with a pattern etched out to form ribbons, provide uneven heating. In contrast, electrothermal heaters formed from the films described herein provide even heat. Indeed, by having the hexagonal boron nitride spread out evenly, the heat is also spread out evenly.

When the films are included in electrothermal heaters, the heaters can include an integral parting strip, with the film configurable to cover at least a portion of a leading edge of the airfoil with the integral parting strip disposed along an air-stagnation zone of the leading edge, and a controller coupled electrically to the film for controlling electrical energy from a power source to the film in accordance with a pulse duty-cycle and for controlling power to the parting strip of the heater to maintain the air-stagnation zone virtually free of ice formation.

The electrothermal heaters can be prepared by preparing the films, as described above, in a rectangular shape having a length substantially greater than the width, suitable for covering at least a portion of a leading edge of the airfoil. Conductor wires can be attached to the film, or to a metal layer, such as a copper layer, adjacent to the film layer. The wires can be attached, for example, at each edge by using bus bars.

Ideally, the heater includes a converter, powered by a suitable power source, for supplying electrical heating energy to the heater over source and return lines which are electrically isolated from the power source. The converter ideally prevents the electrical heating energy from being conducted through the conductive structure of the airfoil. An airplane can include a plurality of these electrothermal heaters, each heater covering a segment of a leading edge of the airfoil, with a controller coupled electrically to each of the heaters for multiplexing electrical energy from a power source among the plurality of heaters in accordance with a pulse duty-cycle. The plurality of heaters can include parting strip areas comprising a multiplicity of differently shaped island areas disposed on the heater surfaces within the parting strip area, where each island area can be separated from the other island areas by the surface of the electrothermal heater.

In one embodiment, the electrothermal heater is coupled to a conductive structure of the airfoil for distributing or dissipating electrical energy of a lightning strike from the region through the conductor to the conductive structure.

The electrothermal heaters and composite materials described herein can be incorporated in or used to replace some or all of the composite materials in aircraft components such as nacelles, fuselage, wings, stabilizers, and other surfaces in need of de-icing.

The heaters and materials can also be present in water heaters, air heaters, heated floor panels, electrothermal ice and erosion protection, potable water systems, hoses, pipes, ducting, walls, ceilings, heated seats, heating pads, aid other articles that require protection from freezing or where the presence of heat would provide comfort and/or safety. Such articles are well known to those skilled in the art.

Methods for manufacturing a composite material including the thermally conducting films and/or electrothermal heaters described herein are also disclosed. In one aspect of the invention, the methods involve forming a composite material without a thermally conductive layer, forming the thermally conductive films, and adhering the film to the remainder of the composite material, for example, using an adhesive layer or in-situ cure.

The film thickness can range from 0.003 in to 0.010 in, and the thickness can be controlled using known methods for forming polymer films, such as calendaring, using a doctor blade, and the like. In those embodiments where a UV-polymerizable material is used, the polymerization can be effected using ultraviolet light, and in other embodiments, the polymerization reaction can be facilitated by exposing the forming film to heat. The thermoset film can be polymerized in-situ with the thermoset composite layers or adhesively bonded secondarily. A thermoplastic film can be heated and pressed with thermoplastic composite layers, or bonded using resistance or ultrasonic welding and the like. The film can also be adhesively bonded to thermoset or thermoplastic layers. The film can be laid up with dry fabric layers or prepreg for subsequent infusion of the polymer using resin transfer molding or resin infusion.

While the present invention has been described herein above in connection with a plurality of aspects and embodiments, it is understood that these aspects and embodiments were presented by way of example with no intention of limiting the invention. Accordingly, the present invention should not limited to any specific embodiment or aspect, but rather construed in breadth and broad scope in accordance with the recitation of the claims appended hereto.

What is claimed is:

1. A method of protecting an aircraft component from ice formation, comprising:
    forming a thermally conducting film from a blend of hexagonal boron nitride and a polymerizable monomer, wherein the hexagonal boron nitride is present in a concentration of from about 12 percent to about 40 percent weight, based on total weight of the film, the film also having electrically conducting material therein, the film having a thermally conductivity of at least 4 W m/k;
    installing an aircraft ice protection electrothermal heater on said aircraft component, the aircraft ice protection electrothermal heater comprising:
        an insulating first layer; and
        the thermally conducting film over the first layer; and
    supplying electrical heating energy to the aircraft ice protection electrothermal heater.

2. The method of protecting an aircraft component from ice formation according to claim 1, wherein:
    the first layer is electrically insulating and thermally insulating.

3. The method of protecting an aircraft component from ice formation according to claim 1, wherein the aircraft ice protection electrothermal heater further comprises:
    an electrically conducting second layer between the first layer and the film, the electrically conducting second layer comprising a heating element.

4. The method of protecting an aircraft component from ice formation according to claim 1, wherein the aircraft ice protection electrothermal heater further comprises:
    an additional layer overlying the film, wherein the additional layer is capable of dissipating energy from a lightning strike.

5. The method of protecting an aircraft component from ice formation according to claim 1, wherein the aircraft ice protection electrothermal heater further comprises:
    an electrically conducting second layer between the first layer and the film, the electrically conducting second layer comprising a heating element; and
    an additional layer overlying the film, wherein the additional layer is capable of dissipating energy from a lightning strike; and wherein:
    the first layer is electrically insulating and thermally insulating.

6. The method of protecting an aircraft component from ice formation according to claim 1, wherein:
    the electrically conducting material is selected from the group consisting of metal powders, metal-coated microspheres, metal-coated carbon-nanotubes, carbon nanofibers, carbon nanotubes, graphite nanoplatelets, copper screen, and aluminum screen.

7. The method of protecting an aircraft component from ice formation according to claim 1, wherein:
    the electrically conducting material is present in a concentration sufficient to allow the film to serve as a heat source.

8. The method of protecting an aircraft component from ice formation according to claim 1, wherein:
    the electrically conducting material is not present in sufficient concentration to provide the film with electrical conductivity.

9. The method of protecting an aircraft component from ice formation according to claim 1, wherein:
    the hexagonal boron nitride is present in a concentration of from about 27 percent to about 33 percent weight, based on total weight of the film.

10. The method of protecting an aircraft component from ice formation according to claim 1, wherein the film further comprises:
    a thermoset resin selected from the group consisting of epoxy based resin systems, matrices of bismaleimide (BMI), phenolic, polyester, PMR-15 polyimide, acetylene terminated resins, acrylics; polyurethanes, and free-radically induced thermosetting resins.

11. The method of protecting an aircraft component from ice formation according to claim 1, wherein the film comprises an epoxy resin.

12. The method of protecting an aircraft component from ice formation according to claim 1, wherein the epoxy resin is selected from the group consisting of:
- diglycidyl ethers of bisphenol A (2,2-bis(4-hydroxyphenyl)propane) or sym-tris(4-hydroxyphenyl)propane;
- tris (4-hydroxyphenyl)methane;
- bisphenol F;
- tetrabromobisphenol A;
- the polyepoxide condensation products of either bisphenol F or tetrabromobisphenol A;
- cycloaliphatic epoxies;
- epoxy-modified novolacs (phenoli-formaldehyde resins); and
- the epoxides derived from the reaction of epichlorohydrin with analine, o-, m- or p-aminophenol, and methylene dianaline.

13. The method of protecting an aircraft component from ice formation according to claim 1, wherein the polymerizable monomer forms a thermoplastic polymer.

14. The method of protecting an aircraft component from ice formation according to claim 13, wherein:
the thermoplastic polymer is selected from polyetheretherketone (PEEK), polyetherketone (PEK), polyphenylene sulfide (PPS), polyethylene sulfide (PES), polyetherimide (PEI), polyvinylidene fluoride (PVDF), polysulfone (PS), polycarbonate (PC), polyphenylene ether/oxide, nylons, aromatic thermoplastic polyesters, aromatic polysulfones, thermoplastic polyimides, liquid crystal polymers, and thermoplastic elastomers.

15. The method of protecting an aircraft component from ice formation according to claim 13, wherein:
the hexagonal boron nitride is present in concentrations of from about 5 percent to about 50 percent by weight of the thermoplastic polymer.

16. The method according to claim 1, comprising:
supplying electrical heating energy to an electrically conducting heating element located between the insulating first layer and the film; wherein:
the first layer is electrically insulating and thermally insulating.

17. The method according to claim 1, comprising:
supplying electrical heating energy to the film; wherein:
the first layer is electrically insulating and thermally insulating; and
a second layer over the film is electrically insulating and thermally conducting.

18. The method according to claim 1, comprising:
forming the film from a blend of hexagonal boron nitride and a polymerizable polymer, wherein the hexagonal boron nitride has a bi-modal particle size.

19. A method of providing an aircraft with an ice protection system, comprising:
forming a thermally conducting film from a blend of hexagonal boron nitride and a polymerizable monomer, wherein the hexagonal boron nitride is present in a concentration of from about 12 percent to about 40 percent weight, based on total weight of the film, the film also having electrically conducting material therein, the film having a thermally conductivity of at least 4 W m/k; and
providing a surface of the aircraft with an aircraft ice protection electrothermal heater comprising:
an insulating first layer; and
the thermally conducting film over the first layer.

20. The method according to claim 19, comprising:
forming the film from a blend of hexagonal boron nitride and a polymerizable polymer, wherein the hexagonal boron nitride has a bi-modal particle size.

* * * * *